United States Patent
Lee et al.

(10) Patent No.: US 11,230,200 B2
(45) Date of Patent: Jan. 25, 2022

(54) APPARATUS FOR CONTROLLING CHARGING SYSTEM USING MOTOR-DRIVING SYSTEM

(71) Applicants: Hyundai Motor Company, Seoul (KR); Kia Motors Corporation, Seoul (KR)

(72) Inventors: Yong Jae Lee, Hwaseong-si (KR); Jae Ho Hwang, Daejeon (KR); Joo Young Park, Yongin-si (KR); Su Hyun Bae, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 396 days.

(21) Appl. No.: 16/432,359

(22) Filed: Jun. 5, 2019

(65) Prior Publication Data
US 2020/0189409 A1   Jun. 18, 2020

(30) Foreign Application Priority Data
Dec. 12, 2018   (KR) .................... 10-2018-0160200

(51) Int. Cl.
*B60L 53/22* (2019.01)
*H02J 7/14* (2006.01)
*H02J 7/00* (2006.01)

(52) U.S. Cl.
CPC ............ *B60L 53/22* (2019.02); *H02J 7/00* (2013.01); *H02J 7/14* (2013.01); *B60L 2210/30* (2013.01); *H02J 2207/20* (2020.01)

(58) Field of Classification Search
CPC .......... B60L 53/22; B60L 53/24; B60L 50/53; B60L 53/10; B60L 53/20; H02J 7/14; H02P 2209/01
USPC ...................... 320/104; 307/10.1, 72, 75, 76
See application file for complete search history.

(56) References Cited

U.S. PATENT DOCUMENTS

| | | | | |
|---|---|---|---|---|
| 7,839,013 B2 * | 11/2010 | Nakamura | ............ | B60W 20/00 307/9.1 |
| 7,847,495 B2 * | 12/2010 | Oyobe | .................... | B60L 50/16 318/53 |
| 8,143,861 B2 * | 3/2012 | Oyobe | .................... | B60L 50/61 320/138 |
| 8,234,028 B2 * | 7/2012 | Yamaguchi | ............ | B60K 6/445 701/22 |
| 8,509,978 B2 * | 8/2013 | Kato | ..................... | B60W 20/13 701/22 |
| 8,515,605 B2 * | 8/2013 | Takaoka | ................ | B60R 16/033 701/22 |
| 8,583,307 B2 * | 11/2013 | Kato | ...................... | B60K 6/445 701/22 |
| 8,766,575 B2 * | 7/2014 | Iwaji | ....................... | H02P 21/04 318/400.17 |
| 9,252,625 B2 * | 2/2016 | Dittmer | .................. | B60L 53/24 |

(Continued)

FOREIGN PATENT DOCUMENTS

| | | | |
|---|---|---|---|
| KR | 10-2012-0047100 A | 5/2012 | |
| KR | 10-2017-0131895 A | 12/2017 | |

*Primary Examiner* — Richard V Muralidar
(74) *Attorney, Agent, or Firm* — Morgan, Lewis & Bockius LLP

(57) ABSTRACT

An apparatus for controlling a charging system using a motor-driving system is configured to suppress the occurrence of torque in a motor when a battery is charged by receiving the supply of external charging current to a neutral point of the motor.

11 Claims, 5 Drawing Sheets

(56) References Cited

U.S. PATENT DOCUMENTS

| | | | |
|---|---|---|---|
| 10,857,898 B2 * | 12/2020 | Shin | B60L 53/11 |
| 2020/0177014 A1 * | 6/2020 | Lee | H02J 7/02 |
| 2020/0373781 A1 * | 11/2020 | Lee | H02J 7/16 |
| 2021/0061118 A1 * | 3/2021 | Lee | H02J 7/1492 |

* cited by examiner

| POWER DIRECTION | NEUTRAL POINT → DC LINK | | | DC LINK → NEUTRAL POINT | | |
|---|---|---|---|---|---|---|
| SECTOR | A-PHASE | B-PHASE | C-PHASE | A-PHASE | B-PHASE | C-PHASE |
| S1 | X | O | O | O | O | X |
| S2 | O | X | O | O | O | X |
| S3 | O | X | O | X | O | O |
| S4 | O | O | X | X | O | O |
| S5 | O | O | X | O | X | O |
| S6 | X | O | O | O | X | O |

O : USED
X : UNUSED

FIG. 5

APPARATUS FOR CONTROLLING CHARGING SYSTEM USING MOTOR-DRIVING SYSTEM

CROSS REFERENCE TO RELATED APPLICATION

The present application claims priority to Korean Patent Application No. 10-2018-0160200 filed on Dec. 12, 2018, the entire contents of which is incorporated herein for all purposes by this reference.

BACKGROUND OF THE INVENTION

Field of the Invention

The present invention relates to an apparatus configured for controlling a charging system using a motor-driving system, and more particularly, to an apparatus configured for controlling a charging system using a motor-driving system, which can suppress the occurrence of torque in a motor when a battery is charged by receiving the supply of external charging current to a neutral point of the motor.

Description of Related Art

Generally, an electric vehicle or a plug-in hybrid vehicle converts electric power supplied from an external charging facility into power in a state suitable for charging a battery in the vehicle, and provides the converted power to the battery to charge the battery.

For example, conventionally, a charging facility for rapid charging has been designed to output a single voltage specification of 400 V. However, a battery used in a vehicle is designed to have a voltage of 800 V or more to improve efficiency and a distance to empty (DTE). Thus, since the battery used in the vehicle has a voltage specification of 800 V or more even though a rapid charging system still provides a charging voltage of 400 V, a step-up converter for boosting the voltage provided from the external charging facility is required to charge the battery.

However, a large-capacity step-up converter for boosting the voltage of 400V to 800V or more is not only very heavy in weight and bulky, but also expensive in price, so that the step-up converter is difficult to provide in a vehicle and increases the price of the vehicle.

Accordingly, generally, there is provided a battery-charging method using a motor neutral point, which can receive the voltage of a charging facility that has been built in a conventional infrastructure to provide a relatively low charging voltage, and may boost the received voltage to a high voltage and provide the boosted voltage to the battery without additional devices or additional costs.

The battery-charging method using the motor neutral point is a charging method that boosts the voltage of the motor neutral point to a voltage level capable of charging the battery using the coil of the motor and the switching element of the inverter while receiving the supply of external charging current to the motor neutral point.

In the battery-charging method using the motor neutral point, since accidents in which a vehicle that is being charged may move and hit nearby facilities or people may occur if torque occurs in the motor, it is very important to control the inverter so that no torque occurs in the motor.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus configured for controlling a charging system using a motor-driving system, which can suppress the occurrence of torque in a motor when a battery is charged by receiving the supply of charging current to a neutral point of the motor in the motor-driving system provided for driving the motor.

In accordance with an aspect of the present invention, there is provided an apparatus configured for controlling a charging system that receives an external charging current at a neutral point of a motor and provides the received external charging current to a battery using a motor-driving system, wherein the motor-driving system may include the battery, an inverter for receiving DC power stored in the battery at a time of driving of the motor to convert the received DC power into three-phase AC power and to output the three-phase AC power to the motor, and the motor configured for generating torque using the three-phase AC power output by the inverter, the apparatus configured for controlling the charging system using the motor-driving system including: a voltage controller configured to compare a voltage command of the neutral point of the motor with a motor neutral point voltage obtained by detecting a voltage of the neutral point of the motor and to generate a neutral point current command for causing the motor neutral point voltage to follow the voltage command; and a current command generator configured to receive the neutral point current command and a rotor angle of the motor, to set one of abc three-phase currents to zero based on a position of abc coordinates corresponding to the rotor angle of the motor, and to determine the remaining two-phase currents for making the torque of the motor zero.

In an exemplary embodiment of the present invention, the current command generator may have a plurality of sectors divided into a positive coordinate axis and a negative coordinate axis of an a-phase of the abc coordinates, a positive coordinate axis and a negative coordinate axis of a b-phase thereof, and a positive coordinate axis and a negative coordinate axis of a c-phase thereof, and may set one of the abc three-phase currents to zero for each of the plurality of sectors within which the rotor angle of the motor falls.

In an exemplary embodiment of the present invention, the current command generator may set the a-phase current to zero when the rotor angle of the motor falls between the negative coordinate axis of the b-phase and the negative coordinate axis of the c-phase, may set the b-phase current to zero when the rotor angle of the motor falls between the negative coordinate axis of the a-phase and the negative coordinate axis of the c-phase, and may set the c-phase current to zero when the rotor angle of the motor falls between the negative coordinate axis of the a-phase and the negative coordinate axis of the b-phase.

In an exemplary embodiment of the present invention, the current command generator may determine the remaining two-phase currents for making a q-axis current on a synchronous coordinate system of the motor zero.

In an exemplary embodiment of the present invention, the current command generator may determine the remaining two-phase currents based on a relational expression between the neutral point current command $I_n$ and each of the abc three-phase currents $I_{as}$, $I_{bs}$, and $I_{cs}$ and a relational expression between a q-axis current $I_{qs}$ on a stationary coordinate system for making a q-axis current on the synchronous coordinate system zero and each of the abc three-phase currents using the following Equation:

$$\begin{bmatrix} I_{ds} \\ I_{qs} \\ I_n \end{bmatrix} = \frac{2}{3} \begin{bmatrix} 1 & -1/2 & -1/2 \\ 0 & \sqrt{3}/2 & -\sqrt{3}/2 \\ 1/2 & 1/2 & 1/2 \end{bmatrix} \begin{bmatrix} I_{as} \\ I_{bs} \\ I_{cs} \end{bmatrix}.$$

In an exemplary embodiment of the present invention, the current command generator may determine the remaining two-phase currents for realizing a d-axis current on the synchronous coordinate system of the motor $$\frac{\lambda_f}{L_q - L_d}$$

($\lambda_f$: magnetic flux of the motor; and $L_d$ or $L_q$: inductance of a d-axis or a q-axis of the motor on the synchronous coordinate system) while changing the current of the motor.

In an exemplary embodiment of the present invention, the current command generator may determine the remaining two-phase currents based on a relational expression between the neutral point current command and each of the abc three-phase currents $I_{as}$, $I_{bs}$, and $I_{cs}$ and a relational expression between a d-axis current $I_{ds}$ on a stationary coordinate system for realizing a d-axis current on the synchronous coordinate system $$\frac{\lambda_f}{L_q - L_d}$$

and each of the abc three-phase currents using the following Equation:

$$\begin{bmatrix} I_{ds} \\ I_{qs} \\ I_n \end{bmatrix} = \frac{2}{3} \begin{bmatrix} 1 & -1/2 & -1/2 \\ 0 & \sqrt{3}/2 & -\sqrt{3}/2 \\ 1/2 & 1/2 & 1/2 \end{bmatrix} \begin{bmatrix} I_{as} \\ I_{bs} \\ I_{cs} \end{bmatrix}.$$

In an exemplary embodiment of the present invention, the current command generator may change, when the rotor angle of the motor is changed, one of the abc three-phase currents set to zero based on a position of the abc coordinates corresponding to the changed rotor angle of the motor while changing the current of the motor.

In an exemplary embodiment of the present invention, the current command generator may determine the remaining two-phase currents for making the torque of the motor zero, and may then output the determined two-phase currents, a dq-axis current on the synchronous coordinate system corresponding to one phase current which is set to zero, and the neutral point current as a current command Idqn*.

In an exemplary embodiment of the present invention, the apparatus configured for controlling the charging system using the motor-driving system may further include: a current controller, configured to compare the current command with a detection dqn current obtained by converting a detection current of each phase of the motor into a dq-axis on a synchronous coordinate system, and to generate a phase voltage command for causing the detection dqn current to follow the current command; and a pulse width modulation (PWM) generator, configured to output a signal for performing ON/OFF control of a switching element in the inverter by applying a predetermined PWM method based on a DC link voltage, via which the inverter and the battery are connected to each other, and the phase voltage command.

In an exemplary embodiment of the present invention, the PWM generator may output a signal for controlling the switching element in the inverter corresponding to the remaining two phases other than the phase, the phase current of which is set to zero, to be subjected to interleaved switching.

As described above, according to the apparatus configured for controlling the charging system using the motor-driving system, it is possible to suppress the occurrence of torque in the motor while the battery is being charged by receiving the charging current at the motor neutral point, so that it is possible to prevent a vehicle including a motor from moving during charging, preventing accidents in which the vehicle moves and hits nearby facilities or people.

The effects obtained as an exemplary embodiment of the present invention are not limited to the effects mentioned above, and other effects not mentioned may be clearly understood by those skilled in the art from the following description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a table showing an example of a phase current applied for each sector of abc coordinates used for an apparatus configured for controlling a charging system using a motor-driving system according to an exemplary embodiment of the present invention to control the torque of a motor to zero.

Figure 1:
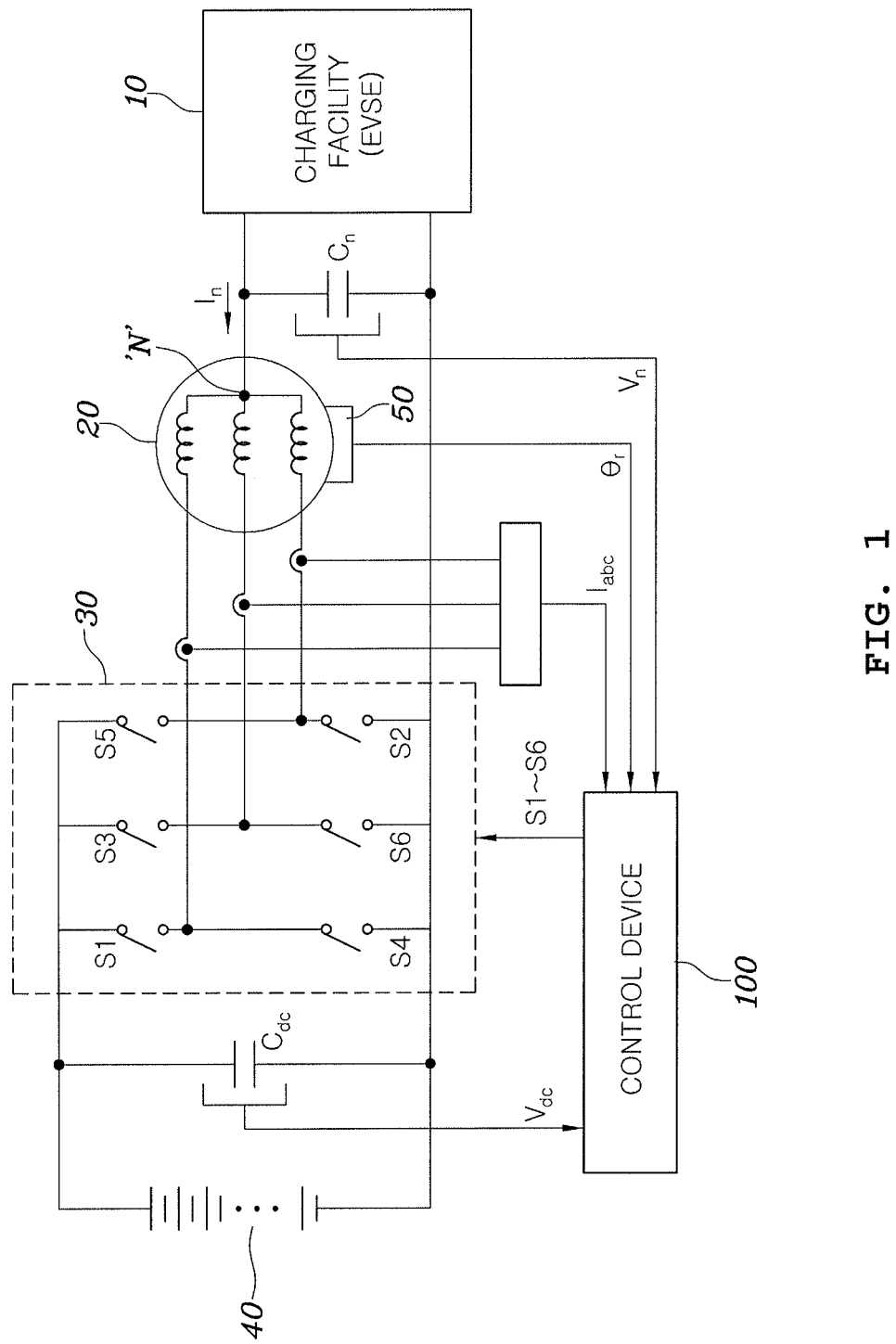
FIG. 1 is a circuit diagram illustrating a charging system using a motor-driving system to which an exemplary embodiment of the present invention is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a circuit diagram of a charging system using a motor-driving system according to various embodiments will be described with reference to the accompanying drawings.

FIG. 1 is a circuit diagram illustrating a charging system using a motor-driving system to which an exemplary embodiment of the present invention is applied.

Referring to FIG. 1, the charging system to which an exemplary embodiment of the present invention is applied is a system for charging a battery 40, which is an energy storage device, through a system provided for driving a motor 20.

In general, the system for driving the motor 20 may include the battery 40, which is an energy storage device that stores power for driving the motor 20, and an inverter 30, which converts DC power stored in the battery 40 into three-phase AC power and provides the three-phase AC power to the motor 20. The system for driving the motor 20 may further include a rotor angle sensor 50, such as a Hall sensor or a resolver, for detecting the angle of the rotor of the motor 20.

The inverter 30 has three legs L1 to L3 connected in parallel with each other at both end portions of the battery 40, two switching elements (two of S1 to S6) are connected in series to each other in each of the legs L1 to L3, and one-phase driving power is provided to the motor 20 at a connection node of the two switching elements. In the present manner, energy flow for driving the motor 20 is realized in the direction toward the motor 20 from the battery 40 of FIG. 1.

Accordingly, one of three-phase coils of the motor 20 and the switching elements S1 to S6 in the legs L1 to L3 of the inductor 30 connected thereto can form one step-up circuit. In other words, a circuit is constituted such that a total of three step-up circuits are connected in parallel between a neutral point N of the motor 20 and the battery 40 by a three-phase motor and a three-phase inverter.

Unlike the energy flow for driving the motor described above, the system to which various embodiments of the present invention is applied may receive external charging power, which is provided to the neutral point N of the motor 20 from an external charging facility (e.g., electric vehicle supply equipment (EVSE)) 10, as the leg corresponding to each phase of the inverter 30, may control the switching element of each leg and boost the voltage of the switching element, and may then provide the boosted voltage to the battery 40, so that the battery 40 may be charged.

That is, in the system to which various embodiments of the present invention are applied, a connection end of the inverter 30 on the side of the motor 20 is configured as an input terminal of the inverter 30, and a connection end of the inverter 30 on the side of the battery 40 is configured as an output terminal of the inverter 30.

A charging system using a motor-driving system to which an exemplary embodiment of the present invention is applied is a charging system using a motor-driving system which includes the battery 40, the inverter 30 for receiving DC power stored in the battery 40 at a time of driving of the motor to convert the received DC power into three-phase AC power and to output the three-phase AC power to the motor 20, and the motor 20 for generating torque using the three-phase AC power output by the inverter 30. The charging system may include a control device 100 that controls the inverter 30 so that a neutral point voltage level of the motor 20 is boosted and output to the battery 40 by pulse width modulation (PWM)-controlling the switching element in the inverter 30 when external charging current is supplied to the neutral point of the motor 20.

Typically, the motor-driving system may receive a current supplied to the motor 20, and may generate a pulse width modulation signal for performing ON/OFF control of the switching element in the inverter 30 in consideration of a DC link voltage $V_{dc}$ of the input terminal of the inverter 30 so that the input current supplied to the motor satisfies a current command determined based on a torque command of the motor. Since the flow of energy is transferred from the battery to the motor the motor-driving system, the current flows from the inverter to the motor.

On the other hand, in the case of the charging system using the motor-driving system, the flow of energy is generated in a direction opposite that of the motor-driving system. That is, if the direction of the current flowing from the inverter to the motor in the motor-driving system is a positive (+) direction, the direction thereof is a negative (−) direction in the charging system. Accordingly, the charging system using the motor-driving system may determine the current command or the detected phase current to be a negative value, and may control the switching elements S1 to S6 in the inverter 30 in a manner similar to that in the motor-driving system.

Figure 2:
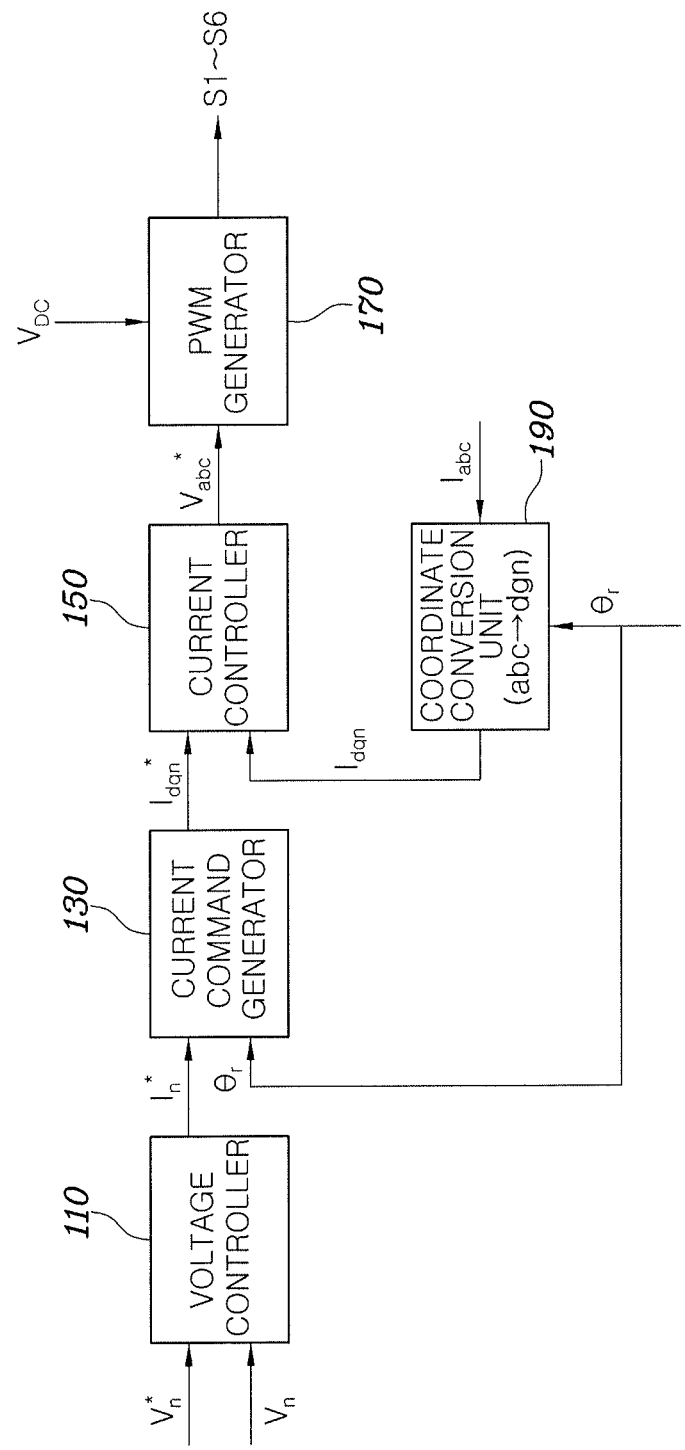
FIG. 2 is a block diagram illustrating, in more detail, an apparatus configured for controlling a charging system using a motor-driving system according to an exemplary embodiment of the present invention.

FIG. 2 is a block diagram illustrating, in more detail, an apparatus configured for controlling a charging system using a motor-driving system according to an exemplary embodiment of the present invention.

Components forming the control device 100 of the charging system using the motor-driving system according to an exemplary embodiment of the present invention shown in FIG. 2 substantially coincide with components in a system for controlling the inverter 30 to drive the motor 20. However, in the charging system, it is important to stably control the voltage of the neutral point N, at which the charging current is provided, so that the inverter 30 is controlled by receiving a command for the voltage of the neutral point N.

Referring to FIG. 2, the control device 100 may include: a voltage controller 110 configured to compare a voltage command Vn* provided from an upper controller or provided by user setting with a motor neutral point voltage Vn obtained by detecting the voltage of the motor neutral point N, and to generate a neutral point current command In* for causing the motor neutral point voltage Vn to follow the voltage command Vn*; a current command generator 130 configured to generate a dqn current command $I_{dq}n^*$ for making the torque of the motor 20 zero based on the neutral point current command In* and a rotor angle θr of the motor 20; a current controller 150, configured to compare the dqn current command $I_{dqn}^*$ with a detection dqn current $I_{dqn}$ obtained by converting a detection current $I_{abc}$ of each phase of the motor 20 into a dq-axis and to generate a phase voltage command $V_{abc}^*$ for causing the dqn current $I_{dqn}$ to follow the dqn current command $I_{dqn}^*$; and a PWM generator 170, configured to output a signal for PWM-controlling the switching element in the inverter 30 by applying a predetermined PWM method based on the DC link voltage $V_{DC}$, via which the inverter 30 and the battery 40 are connected to each other, and the phase voltage command $V_{abc}^*$.

Obviously, the control device 100 may further include a coordinate conversion unit 190 configured to convert results obtained by detecting each phase current of the motor 20 using the current controller 150 into a dq-axis current on a synchronous coordinate system to generate a dqn current.

The control device 100 may be implemented in a form including a processor, which physically executes predetermined computation and control algorithms, and a memory that stores information necessary for computation and a program that implements the control algorithm. The voltage controller 110, the current command generator 130, the current controller 150, the PWM generator 170, and the coordinate conversion unit 190, which form the control device to be described later, may be stored in the memory in a form of a program for implementing each control algorithm, and the processor may execute the program to implement each control algorithm.

The voltage controller 110 and the current controller 150 may be implemented by a controller applying a typical control method such as a proportional integral (PI), a proportional integral derivative (PID), or the like, which generates output for causing a detected value of input two values to follow a command. Also, the PWM generator 170 may generate and output a PWM control signal in a predetermined PWM method (e.g., space vector PWM or the like) based on the DC link voltage $V_{DC}$ and the phase voltage command $V_{abc}^*$. Since the voltage controller 110, the current controller 150, the PWM generator 170, and the coordinate conversion unit 190 are already known to a person skilled in the art or may be fully understood through the detailed description of the present invention, further descriptions thereof will be omitted.

An exemplary embodiment of the present invention is characterized in that the current command generator 130, which has received the neutral point current command In* generated by the voltage controller 110 so that the motor neutral point voltage Vn follows the motor neutral point voltage command Vn*, may generate the dqn current command $I_{dqn}^*$ for adjusting the torque of the motor 20 to zero by applying the received neutral point current command In*.

Hereinafter, a control operation performed by the current command generator 130 will be described in more detail.

It is known that the torque of a motor, particularly a recessed permanent magnet synchronous motor, can be determined by the following equation:

$$T_e = \frac{3}{2}\frac{P}{2}[\lambda_f + (L_d - L_q)I_d]I_q.$$ [Equation 1]

In Equation 1, Te denotes the torque of the motor, $\lambda_f$ denotes the magnetic flux of the motor, $L_d$ or $L_q$ denotes inductance of a d-axis or a q-axis on a synchronous coordinate system of the motor, $I_d$ or $I_q$ denotes the current of the d-axis or the q-axis of the motor in the synchronous coordinate system, and P denotes the number of poles of the motor 20. In Equation 1, $\lambda_f$, $L_d$, $L_q$, and P are constants that are determined at a time of manufacture of the motor.

According to Equation 1, to adjust the torque of the motor to zero, the condition $I_q=0$ or the condition $\lambda_f+(L_d-L_q)/I_d=0$ may be satisfied. Hereinafter, the former is referred to as a first condition and the latter as a second condition.

Figure 3:
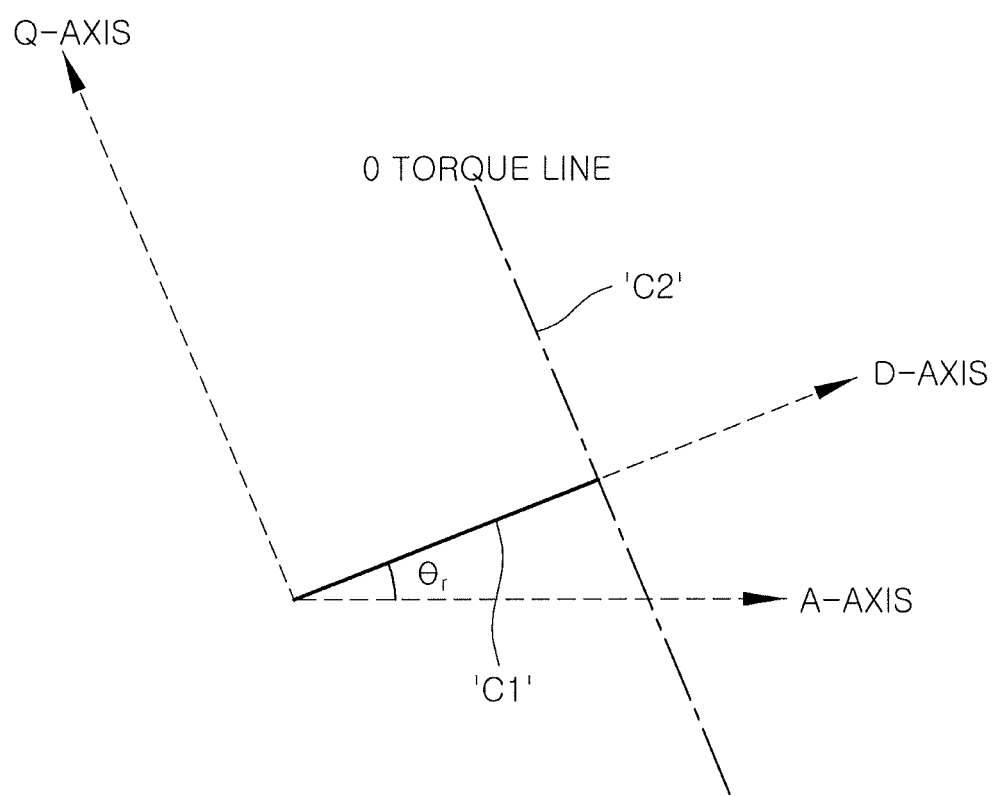
FIG. 3 is a diagram illustrating coordinates for explaining the case in which an apparatus configured for controlling a charging system using a motor-driving system according to an exemplary embodiment of the present invention controls the torque of a motor to zero.

FIG. 3 is a diagram illustrating coordinates for explaining the case in which an apparatus configured for controlling a charging system using a motor-driving system according to an exemplary embodiment of the present invention controls the torque of a motor to zero.

A d-axis of dq coordinates (synchronous coordinate system) is rotated and positioned at a rotor angle $\theta_r$ of the motor 20 from a positive (+) a-axis of abc coordinates. The first condition is a position at which a q-axis current is zero, and corresponds to the portion indicated by reference numeral "C1" in FIG. 3. The second condition is a position where a d-axis current has a constant value of $$\frac{\lambda_f}{L_q - L_d}$$

and corresponds to the portion indicated by reference numeral "C2" in FIG. 3.

The current command generator 130 in the control device 100 generates dqn current command $I_{dqn}^*$ to satisfy the condition shown in FIG. 3.

Control for Satisfying First Condition

Since the current command generator 130 is aware of the rotor angle $\theta_r$ due to the rotor angle sensor 50 provided in the motor 20, it is possible to know in which sector on the abc coordinates points, where the q-axis current becomes zero, are present.

Figure 4:
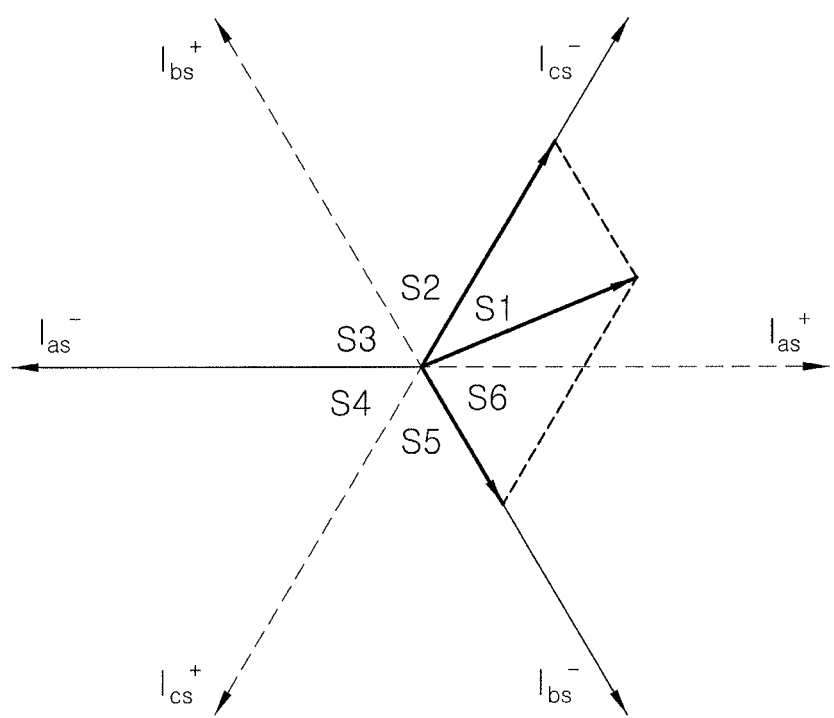
FIG. 4 is a diagram illustrating abc coordinates used for an apparatus configured for controlling a charging system using a motor-driving system according to an exemplary embodiment of the present invention to control the torque of a motor to zero, and an example of a sector within which a phase current falls.

FIG. 4 is a diagram illustrating abc coordinates used for an apparatus configured for controlling a charging system using a motor-driving system according to an exemplary embodiment of the present invention to control the torque of a motor to zero and an example of a sector within which a phase current falls.

In the abc coordinates shown in FIG. 4, reference numerals "S1" to "S6" are sectors that are divided into a positive coordinate axis and a negative coordinate axis of an a-phase of the abc coordinates, a positive coordinate axis and a negative coordinate axis of a b-phase thereof, and a positive coordinate axis and a negative coordinate axis of a c-phase thereof. As described with reference to FIG. 3, the rotor angle $\theta_r$ of the motor 20 represents an angle rotated counterclockwise from the coordinate axis of the a-phase, so that the current command generator 130 may be made aware of a sector condition on the abc coordinates based on the angle $\theta_r$ of the rotor, provided by the rotor angle sensor 50 disposed in the motor 20.

The sector condition is used for setting the phase current of one of abc three-phases to zero, and, as shown in FIG. 4, when the rotor angle $\theta_r$ is positioned in a first sector S1, the corresponding position may be represented by the negative coordinates of the c-phase and the negative coordinates of the b-phase, so that the a-phase current may be set to zero. According to various embodiments of the present invention, since the current is supplied from the motor 20 to the battery 40, one of the abc-phases may be set to zero based on the negative coordinate axis of the abc-phases.

FIG. 5 is a table showing an example of phase current applied for each sector of abc coordinates used for an apparatus configured for controlling a charging system using a motor-driving system according to an exemplary embodiment of the present invention to control the torque of a motor to zero.

Referring to FIG. 5, according to various embodiments of the present invention, values corresponding to the case in which the direction in which power is supplied is the direction of a DC link to which the battery 40 is connected at the neutral point N of the motor 20 may be used.

In the first condition, since one phase of abc three-phases may be set to zero by the rotor angle of the motor, the current command generator 130 may determine the currents of the remaining two phases so that the motor torque may be adjusted to be zero.

The current command generator 130 can determine the currents of the two phases using the following Equation 2:

$$\begin{bmatrix} I_{ds} \\ I_{qs} \\ I_n \end{bmatrix} = \frac{2}{3} \begin{bmatrix} 1 & -1/2 & -1/2 \\ 0 & \sqrt{3}/2 & -\sqrt{3}/2 \\ 1/2 & 1/2 & 1/2 \end{bmatrix} \begin{bmatrix} I_{as} \\ I_{bs} \\ I_{cs} \end{bmatrix}.$$  [Equation 2]

In Equation 2, $I_{ds}$ and $I_{qs}$ denote a d-axis current and a q-axis current of the motor in a stationary coordinate system, respectively, and $I_n$ denotes a neutral point current of the motor.

As described above, in the first condition, since the sector in which the points where the q-axis current becomes zero on the abc coordinates are present are already determined by the rotor angle $\theta_r$, if the current of one phase is set to zero according to the sector condition as shown in FIG. 5, it is possible to generate a current command that makes the q-axis current zero in the synchronous coordinate system by determining only the currents of the remaining two phases.

In Equation 2, since the neutral point current $I_n$ becomes a neutral point current command input by the voltage controller 110, one relational expression between the neutral point current and the currents of the two phases is derived. Also, since the q-axis current in the synchronous coordinate system is zero, a relational expression between a value obtained by converting the q-axis current to the stationary coordinate system and the currents of the two phases may be derived from Equation 2.

The relationship between the synchronous coordinate system and the stationary coordinate system is expressed by Equation 3 below.

$$\begin{bmatrix} I_d \\ I_q \\ I_n \end{bmatrix} = \begin{bmatrix} \cos\theta_r & \sin\theta_r & 0 \\ -\sin\theta_r & \cos\theta_r & 0 \\ 0 & 0 & 1 \end{bmatrix} \begin{bmatrix} I_{ds} \\ I_{qs} \\ I_{ns} \end{bmatrix}$$  [Equation 3]

According to Equation 3, in the first condition, the q-axis current must be zero in the synchronous coordinate system, so that the condition of the following Equation 4 should be satisfied.

$$I_q = -\sin\theta_r \cdot I_{ds} + \cos\theta_r \cdot I_{qs} = 0$$  [Equation 4]

Since one of the three phase currents $I_{as}$, $I_{bs}$, and $I_{cs}$ is set to zero as described above, the remaining two phase currents, which are unknown numbers, may be determined through two equations, including one equation, which is derived by substituting an equation for the dq-axis currents $I_{ds}$ and $I_{qs}$ into the derived stationary coordinate system derived using Equation 2, into Equation 4 and another equation for the neutral point current in Equation 2.

The current command generator 130 searches for currents of abc three-phases including the current of one phase set to zero and the currents of the two phases satisfying the first condition, as described above, and outputs the dq-axis current and the neutral point current in the synchronous coordinate system corresponding to the three-phase currents to the current controller 150 as the current command $I_{dqn}^*$.

Control for Satisfying Second Condition

When phase current satisfying the above-described first condition is not found, the current command generator 130 searches for phase current satisfying the condition $$\lambda_f + (L_d - L_q)I_d = 0.$$

Similar to the method of searching for phase current satisfying the above-described first condition, the current command generator 130 can set the current of one phase to zero and search for currents of the remaining two phases using Equation 2.

The current command generator 130 searches for phase current satisfying the second condition while changing the motor current for the control to satisfy the second condition. The current command generator 130 searches for phase current satisfying the second condition while changing the angle $\theta_r$ of the position of the rotor, by changing the current command to a predetermined magnitude.

Similar to the method of searching for the phase current satisfying the above-described first condition, the current command generator 130 searches the sector within which a point corresponding to the angle $\theta_r$ of the position of the rotor falls and determines the phase current that becomes zero in the corresponding sector, as shown in FIG. 5.

Next, the current command generator 130 searches the two phase currents using the relational expression derived from Equations 2 and 3. According to Equation 2, using two equations, including one equation related to the neutral point current using the remaining two-phase currents, other than one phase current determined to be zero by determining the sector, and another equation indicating the relationship between the d-axis current $$\frac{\lambda_f}{L_q - L_d}$$

on the synchronous coordinate system and the two-phase currents by substituting the dq-axis current on the stationary coordinate system into an equation for the d-axis current on the synchronous coordinate system derived by Equation 3, values of the two-phase currents other than the phase current set to zero are determined. That is, two relational expressions representing the relationship between the currents of the two phases, which are two unknown numbers, and the currents of the two phases are derived, so that the currents of the two phases may be determined.

The current command generator 130 searches the currents of the abc-three phases including the current of one phase set to zero and the currents of the two phases satisfying the second condition as described above, and outputs the dq-axis current and the neutral point current in the synchronous coordinate system corresponding to the currents of the three-phase to the current controller 150 as the current command $I_{dqn}^*$.

The current controller 15 compares the dqn current command $I_{dqn}^*$ received by the current command generator 130 with the detection dqn current $I_{dqn}$ obtained by converting the detection current $I_{abc}$ of each phase of the motor 20 into the dq-axis, and generates the phase voltage command $V_{abc}^*$ for causing the dqn current $I_{dqn}$ to follow the dqn current command $I_{dqn}^*$.

The PWM generator 170 may generate and output a PWM control signal in a scheme such as a predetermined PWM scheme (e.g., space vector PWM or the like) based on the DC link voltage $V_{DC}$ and the phase voltage command $V_{abc}^*$. The PWM generator 170 may perform ON/OFF control of the switching elements of the inverter 30, and may control the switching elements corresponding to each phase in a same-phase switching scheme or an interleaved switching scheme. In various embodiments of the present invention, since the current of one phase is set to zero, it is possible to control the switching elements that determine the remaining two phases that are not set to zero, so that the switching elements may be subjected to interleaved switching. When the interleaved switching scheme is applied, a zero-phase voltage ripple may be reduced, and losses may be minimized.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus for controlling a charging system that receives an external charging current at a neutral point of a motor and provides the received external charging current to a battery using a motor-driving system, wherein the motor-driving system includes the battery, an inverter for receiving DC power stored in the battery at a time of driving of the motor to convert the received DC power into three-phase AC power and to output the three-phase AC power to the motor, and the motor for generating torque using the three-phase AC power output by the inverter, the apparatus comprising:
    a voltage controller configured to compare a voltage command of the neutral point of the motor with a motor neutral point voltage obtained by detecting a voltage of the neutral point of the motor and to generate a neutral point current command for causing the motor neutral point voltage to follow the voltage command; and
    a current command generator configured to receive the neutral point current command and a rotor angle of the motor, to set one of abc three-phase currents to zero based on a position of abc coordinates corresponding to the rotor angle of the motor, and to determine remaining two-phase currents for making the torque of the motor zero.

2. The apparatus for controlling the charging system using the motor-driving system of claim 1,
    wherein the current command generator has a plurality of sectors divided into a positive coordinate axis and a negative coordinate axis of an a-phase of the abc coordinates, a positive coordinate axis and a negative coordinate axis of a b-phase thereof, and a positive coordinate axis and a negative coordinate axis of a c-phase thereof, and sets one of the abc three-phase currents to zero for each of the plurality of sectors within which the rotor angle of the motor falls.

3. The apparatus for controlling the charging system using the motor-driving system of claim 2, wherein the current command generator is configured to
    set the a-phase current to zero when the rotor angle of the motor falls between the negative coordinate axis of the b-phase and the negative coordinate axis of the c-phase,
    set the b-phase current to zero when the rotor angle of the motor falls between the negative coordinate axis of the a-phase and the negative coordinate axis of the c-phase, and
    set the c-phase current to zero when the rotor angle of the motor falls between the negative coordinate axis of the a-phase and the negative coordinate axis of the b-phase.

4. The apparatus for controlling the charging system using the motor-driving system of claim 1,
    wherein the current command generator determines the remaining two-phase currents for making a q-axis current on a synchronous coordinate system of the motor zero.

5. The apparatus for controlling the charging system using the motor-driving system of claim 4,
    wherein the current command generator determines the remaining two-phase currents based on a relational expression between the neutral point current command $I_n$ and each of the abc three-phase currents $I_{as}$, $I_{bs}$, and $I_{cs}$, a relational expression between a d-axis current $I_{ds}$ and each of the abc three-phase currents $I_{as}$, $I_{bs}$, and $I_{cs}$, and a relational expression between a q-axis current $I_{qs}$ on a stationary coordinate system for making a q-axis current on the synchronous coordinate system zero and each of the abc three-phase currents $I_{as}$, $I_{bs}$, and $I_{cs}$, using the following Equation:

$$\begin{bmatrix} I_{ds} \\ I_{qs} \\ I_n \end{bmatrix} = \frac{2}{3} \begin{bmatrix} 1 & -1/2 & -1/2 \\ 0 & \sqrt{3}/2 & -\sqrt{3}/2 \\ 1/2 & 1/2 & 1/2 \end{bmatrix} \begin{bmatrix} I_{as} \\ I_{bs} \\ I_{cs} \end{bmatrix}.$$

6. The apparatus for controlling the charging system using the motor-driving system of claim 1,
    wherein the current command generator determines the remaining two-phase currents for realizing a d-axis current having a value of $$\frac{\lambda_f}{L_q - L_d}$$

on the synchronous coordinate system of the motor, while changing a current of the motor, and wherein $\lambda_f$ is magnetic flux of the motor, and $L_d$ is inductance of a d-axis of the motor, and $L_q$ is inductance of a q-axis of the motor on the synchronous coordinate system.

7. The apparatus for controlling the charging system using the motor-driving system of claim 6,
wherein the current command generator determines the remaining two-phase currents based on a relational expression between the neutral point current command $I_n$ and each of the abc three-phase currents $I_{as}$, $I_{bs}$, and $I_{cs}$ and a relational expression between the d-axis current $I_{ds}$ on a stationary coordinate system for realizing the d-axis current having the value of $$\frac{\lambda_f}{L_q - L_d}$$

on the synchronous coordinate system and each of the abc three-phase currents using the following Equation:

$$\begin{bmatrix} I_{ds} \\ I_{qs} \\ I_n \end{bmatrix} = \frac{2}{3} \begin{bmatrix} 1 & -1/2 & -1/2 \\ 0 & \sqrt{3}/2 & -\sqrt{3}/2 \\ 1/2 & 1/2 & 1/2 \end{bmatrix} \begin{bmatrix} I_{as} \\ I_{bs} \\ I_{cs} \end{bmatrix}.$$

8. The apparatus for controlling the charging system using the motor-driving system of claim 5,
wherein the current command generator changes, when the rotor angle of the motor is changed, one of the abc three-phase currents set to zero based on a position of the abc coordinates corresponding to the changed rotor angle of the motor while changing the current of the motor.

9. The apparatus for controlling the charging system using the motor-driving system of claim 1,
wherein the current command generator determines the remaining two-phase currents for making the torque of the motor zero and then outputs the determined two-phase currents, a dq-axis current on the synchronous coordinate system corresponding to one phase current which is set to zero, and the neutral point current command as a current command.

10. The apparatus for controlling the charging system using the motor-driving system of claim 9, further including:
a current controller configured to compare the current command with a detection dqn current, obtained by converting a detection current of each phase of the motor into a dq-axis on a synchronous coordinate system, and to generate a phase voltage command for causing the detection dqn current to follow the current command; and
a pulse width modulation (PWM) generator configured to output a signal for performing ON or OFF control of a switching element in the inverter by applying a predetermined PWM method based on a DC link voltage via which the inverter and the battery are connected to each other and the phase voltage command.

11. The apparatus for controlling the charging system using the motor-driving system of claim 10,
wherein the PWM generator outputs a signal for controlling the switching element in the inverter corresponding to the remaining two phases other than the phase, the phase current of which is set to zero, to be subjected to interleaved switching.

* * * * *